(12) United States Patent
Hicken et al.

(10) Patent No.: US 10,552,853 B2
(45) Date of Patent: Feb. 4, 2020

(54) DYNAMIC DETERMINATION OF SERVICE ALLOCATION AND FULFILLMENT

(71) Applicant: YP LLC, Tucker, GA (US)

(72) Inventors: Wendell Hicken, Tucker, GA (US); Corey McMahon, Tucker, GA (US); Deepak Thakral, Tucker, GA (US); Teodoro Gomez, Tucker, GA (US); Giri Damerla, Tucker, GA (US); Harish Goli, Tucker, GA (US); Nagendra Lavu, Tucker, GA (US)

(73) Assignee: YP LLC, Tucker, GA (US)

( * ) Notice: Subject to any disclaimer, the term of this patent is extended or adjusted under 35 U.S.C. 154(b) by 827 days.

(21) Appl. No.: 14/505,409

(22) Filed: Oct. 2, 2014

(65) Prior Publication Data

US 2016/0098731 A1 Apr. 7, 2016

(51) Int. Cl.
*G06Q 30/02* (2012.01)

(52) U.S. Cl.
CPC ..... *G06Q 30/0201* (2013.01); *G06Q 30/0273* (2013.01)

(58) Field of Classification Search
None
See application file for complete search history.

(56) References Cited

U.S. PATENT DOCUMENTS

| 2006/0004731 | A1* | 1/2006 | Seibel | G06F 17/30719 |
| 2006/0190354 | A1* | 8/2006 | Meisel | G06Q 20/10 705/14.73 |
| 2009/0070194 | A1* | 3/2009 | Song | G06Q 30/02 705/14.54 |
| 2012/0253924 | A1* | 10/2012 | Giese | G06Q 30/02 705/14.48 |
| 2013/0097013 | A1* | 4/2013 | Schaub | G06Q 30/0249 705/14.45 |
| 2014/0304088 | A1* | 10/2014 | Snyder | G06Q 90/00 705/14.71 |
| 2014/0365298 | A1* | 12/2014 | Tang | G06Q 30/02 705/14.48 |

* cited by examiner

*Primary Examiner* — Eric W Stamber
*Assistant Examiner* — Alan Torrico-Lopez
(74) *Attorney, Agent, or Firm* — Greensfelder, Hemker & Gale P.C.

(57) ABSTRACT

A determination is produced as to the number of leads that can be provided from a system to a target business entity, wherein the leads are generated from a plurality of platforms. The platforms may include platforms that comprise system sources for leads, i.e., sources that are internal or organic to the system, for which it is unnecessary to pay third parties for the leads. The platforms may also include platforms that comprise external sources for leads, such that the leads must be purchased from the external sources. In response to parameters related to the target business entity, an estimated number of leads per unit time is generated for a range of payments to the system by the target business entity. The number of leads to be originated from each of the respective platforms is determined by business rules preferences, which may be specified by the target business entity. Adjustments can be made in real time to the mix of platforms from which leads are generated, in response to received performance data and pricing information.

17 Claims, 10 Drawing Sheets

US 10,552,853 B2

DYNAMIC DETERMINATION OF SERVICE ALLOCATION AND FULFILLMENT

BACKGROUND

This disclosure relates to marketing campaigns for utilizing leads comprising sales propositions in the form of telephone calls, e-mail messages, advertising impressions through Web browsers, form-fills over the Internet, coupons delivered or redeemed, and the like, in furtherance of business for a target business entity.

One of the ways in which business entities achieve their business goals for increasing revenues and profit is by pursuing leads for additional purchases by business customers. The leads may comprise, for example, telephone calls to the business entity, received e-mail messages, advertising impressions through Web browsers, received form-fills over the Internet, coupons delivered or redeemed, and the like. Marketing campaigns can be developed to utilize such leads, but generating such marketing campaigns can be challenging. Marketing campaigns should have the possibility of drawing from multiple sources of leads and should be capable of adjusting the allocation of leads from among the multiple sources.

Consulting firms are available to help with marketing, but such services can be complicated and may involve a relatively great deal of time and participation on the part of the business entity, and can be comparatively expensive. Cost-effective marketing campaigns for business entities, without large commitments of time by the business entities, are desired. Such marketing campaigns should have capability of drawing from multiple sources of leads and should be capable of adjusting the allocation of leads from among the multiple sources.

SUMMARY

In some aspects, a determination is made as to the number of leads that can be provided from a system to a target business entity, wherein the leads are generated from a plurality of platforms. The platforms may include platforms that comprise system sources for leads, i.e., sources that are internal or organic to the system, for which it is unnecessary to pay third parties for the leads. The platforms may also include platforms that comprise external sources for leads, such that the leads must be purchased from the external sources. In response to parameters related to the target business entity, an estimated number of leads per unit time is generated for a range of payments to the system by the target business entity. The number of leads to be originated from each of the respective platforms is determined by business rules preferences, which may include cost, number of desired leads, available inventory, and the like. The projected number of leads may be generated from a customer projection tool that can combine information from Internet based data, printed media data, and external data. The business rules preferences may be specified by the target business entity. Adjustments can be made in real time to the mix of platforms from which leads are generated, in response to received performance data and pricing information. These features may be performed by computer-implemented methods, computer systems, and by systems that execute machine-readable instructions embodied on a non-transitory machine-readable medium to perform the method.

Other features of the disclosed subject matter will be apparent from the following description of the embodiments, which illustrate, by way of example, the principles of the disclosed subject matter.

DETAILED DESCRIPTION

Figure 1:
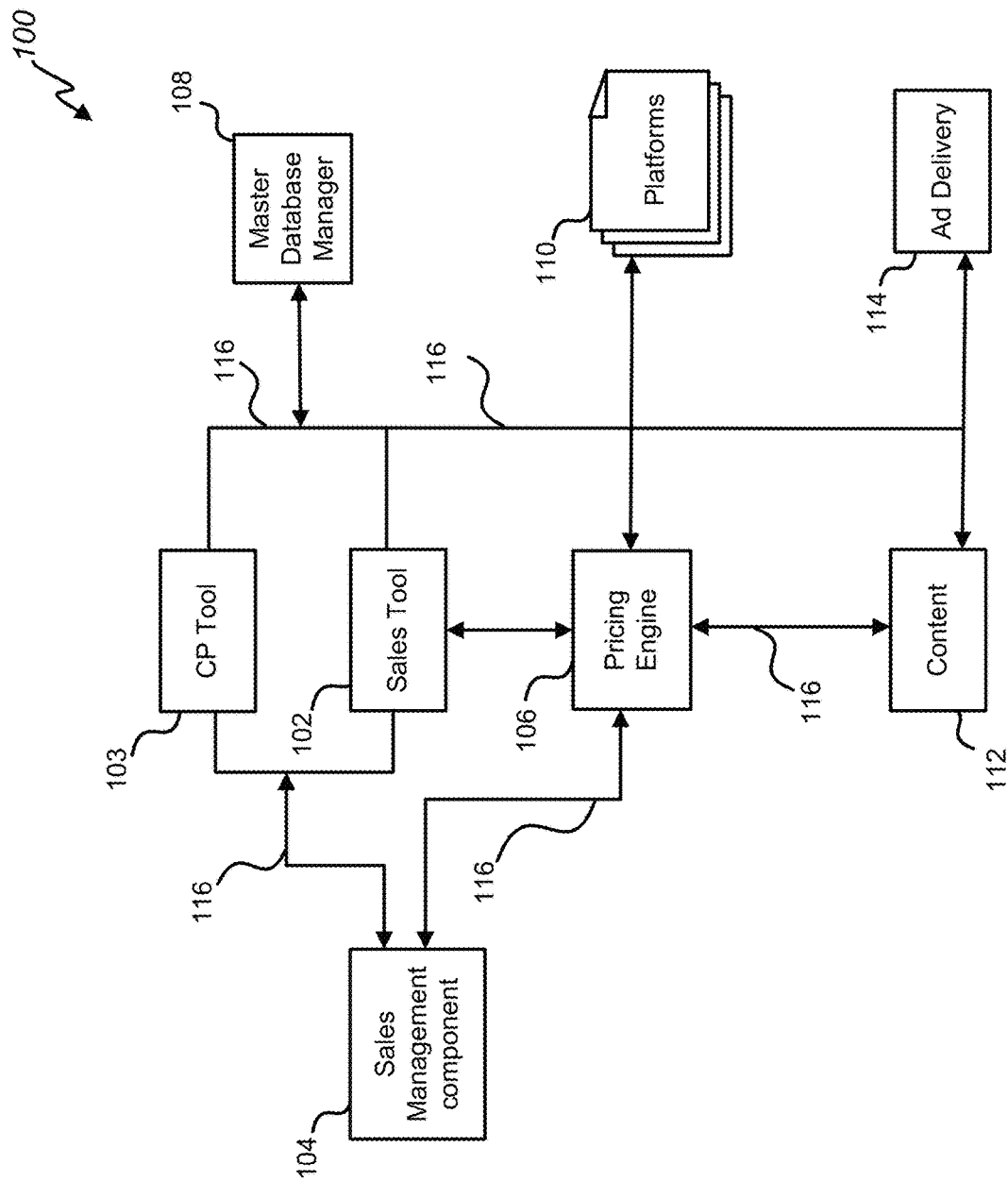
FIG. 1 is a block diagram of an example of a computer system that provides the features disclosed herein.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example without limitation, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, and the like. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices, and/or other machine readable mediums for storing information. The term "computer-readable medium" includes, but is not limited to, portable or fixed storage devices, optical storage devices, wireless channels, and various other mediums capable of storing, containing, or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and the like may be passed, forwarded, or transmitted via any suitable means, including memory sharing, message passing, token passing, network transmission, and the like.

Various embodiments will now be discussed in greater detail with reference to the accompanying figures, beginning with FIG. 1.

FIG. 1 shows a block diagram of an example of a computer system 100 that provides the features disclosed herein. A sales tool 102 communicates with a sales management component 104 of the system 100. A customer projection (CP) tool 103 also communicates with a sales management component 104 of the system 100. The sales management component 104 receives data input from the sales tool 102, which is used by a marketing sales force and which may comprise a computing device such as a desktop computer, laptop computer, tablet computer, smart phone, or the like. The sales management component 104 may also receive data from the CP tool 103, such as projections of leads from various sources. For a mobile sales force, the sales tool may comprise a portable computing device. The sales tool 102 may also obtain access to operations of the CP tool 103. The sales management component manages the data it receives so that the received data is communicated to a pricing engine 106 and may then be communicated to a master database manager 108, which incorporates a master database. The sales management component 104 and pricing engine communicate with multiple platforms 110, which comprise sources of leads. The leads may comprise sales propositions in the form of telephone calls, e-mail messages, advertising impressions, form-fills over the Internet, coupons delivered or redeemed, and the like, in furtherance of business for a target business entity.

The pricing engine 106 performs operations comprising determining a number of leads that can be provided from the system to a target business entity, wherein the leads are generated from the plurality of platforms 110. The platforms may include platforms that comprise system sources for leads, i.e., internal or organic sources of leads, for which it is unnecessary to pay third parties for the leads. The platforms may also include platforms that comprise external sources for leads, such that the leads must be purchased from the external sources. The pricing engine 106 responds to parameters related to the target business entity and generates an estimated number of leads per unit time for a range of payments to the system by the target business entity. The number of leads to be originated from each of the respective platforms is determined by business rules preferences, which may include cost, number of desired leads, available inventory, and the like, and may be received into the system 100 through the sales tool 102 based on specified parameters provided by the target business entity. Adjustments can be made in real time to the mix of platforms from which leads are generated, in response to received performance data and pricing information.

Communications with the target business entity may be passed through the sales tool 102, which can send and receive messages and can display information for viewing.

Operation of the system 100 involves a sales person using the sales tool device 102 to log in to the sales management component 104, which may be provided by software application suites such as "Salesforce" and the like. Upon logging in, the sales person will see their list of leads displayed on the sales tool device 102. The sales person can use their sales tool device to click on a displayed lead and can also go to a new lead. That is, in one instance, the sales tool device 102 includes a display on which a sales person can select a sales lead, in response to which the sales tool device will display detailed information about the selected sales lead. In another instance, the sales person can select another sales lead from the display, such as by selection of a "Back" display button or by selection of a dedicated "Sales Leads" button. These operations are described in further detail below, in conjunction with the description of FIGS. 3, 4, 5, and 6.

As noted above, the sales person may also gain access to operations of the CP tool 103, either explicitly by the sales person requesting services through inputs to the sales tool device display, or through operations of the sales tool device performing operations of its own, without prompt by display inputs from the sales person. The sales tool device will support updating/fleshing out metadata for each target business entity, including grouping multiple related businesses (e.g., two locations for a restaurant), and during the sales process, free listings for the potential advertising business entity can be viewed (i.e., a target business entity can set up their account). In this way, business data can be collected upon establishing a business relationship in this manner. As part of this process, an accurate description of the target business entity can be collected, to determine business categories served, such as whether the business will travel to the customer or if the customer travels to them, and what geographic areas are relevant to the business, and the like. This data collection permits the system to better target the business entity for agreeing to purchase marketing campaign services and the like from the system operator.

Once the business has been properly identified, the sales tool device 102 can be used to communicate with the pricing engine 106 to get the available offers. Each offer consists of a monthly price, and a target range of leads to be provided. There may be a seasonality curve with respect to the leads, where appropriate, especially in the situation where the lead target is provided with leads over the course of the marketing campaign, so the distribution of leads may not be equally divided month over month. The pricing engine 106 may communicate with platforms 110 that are internal to the system and that are external to the system. External platforms may comprise, for example, search engines and Web portals such as "Google", "Yahoo!", "Bing", "About.com", blogs, and the like. When the pricing engine obtains prices for leads, the pricing engine may generate one or more advertising and online marketing campaigns. The generated marketing campaigns are presented as packages, comprising a proposed or promised flow of leads per unit time to the target business entity. The marketing campaign will draw on content 112 comprising creative features such as banner ads, display ads, email solicitations, and the like, and the ad content 112 will be delivered to third party users via an ad delivery component 114.

Packaged marketing campaigns will typically have dollar costs to the business that will vary, based on a number of factors. The factors may include, for example, information about the existing advertiser, the available inventory, whether the business has multiple locations, and the like. Call recording will usually be available for categories where it can be offered.

Communications among the components illustrated in FIG. 1 may take place over network connections 116 between the components. The network connections may comprise, for example, a private or internal network of the system 100, or may comprise a network such as the Internet, or may be a combination of private and Internet network connections. Communications among the various illustrated components 102, 103, 104, and so forth may occur over any path by which the components have a connection over the network 116.

Figure 2:
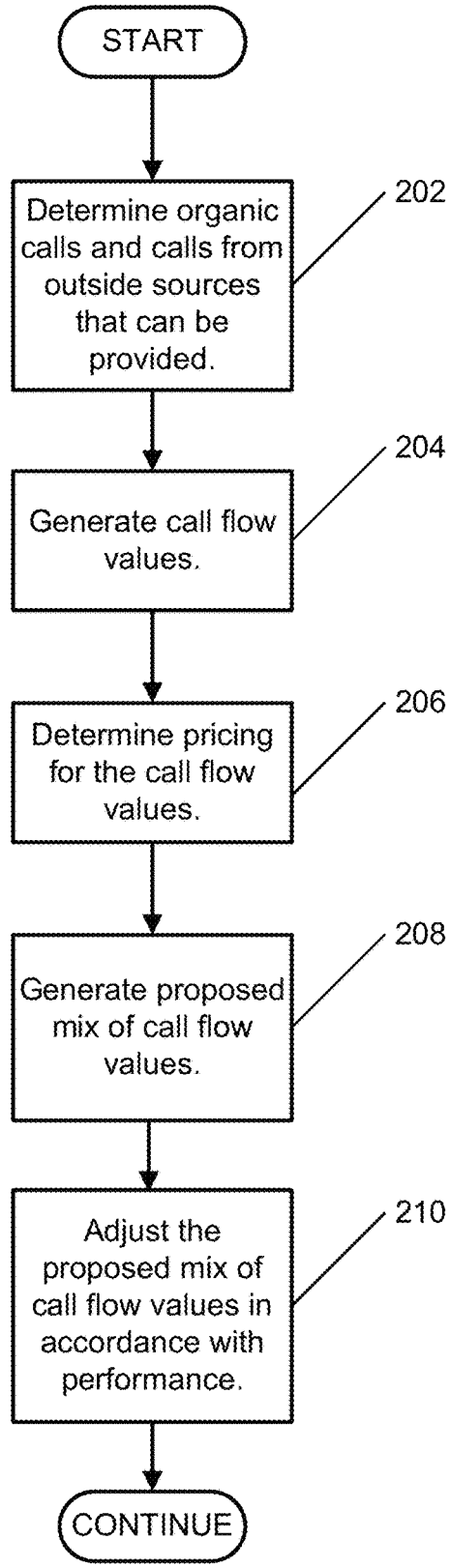
FIG. 2 is a flow diagram of an example of the processing performed by the system illustrated in FIG. 1.

FIG. 2 is a flow diagram of an example of the processing performed by the system illustrated in FIG. 1 for generating proposed leads and marketing campaigns.

In the operation of FIG. 2 represented by the box numbered 202, the FIG. 1 system receives parameters for each target business entity, including grouping multiple related businesses (e.g., two locations for a restaurant), and during the sales process, free listings for the potential advertising business entity can be viewed (i.e., a target business entity can set up their account). In this way, business data can be collected upon establishing a business relationship in this manner. As part of this process, an accurate description of the target business entity can be collected, to determine business categories served, such as whether the business will travel to the customer or if the customer travels to them, and what geographic areas are relevant to the business, and the like. This data collection permits the system to better target the business entity for agreeing to purchase marketing campaign services and the like from the system operator.

In the FIG. 2 operation represented by the box 204, the system generates a number comprising an estimated number of leads per unit time for a range of payments to the system by the target business entity. The number of leads represents a predetermined number of leads to the target business entity, wherein a lead may comprise, for example, a telephone call placed to the business entity by a potential customer, a received e-mail message, a received form-fill over the Internet, a sent or redeemed coupon, and the like. The operation of the box 204 provides, for example, a graph of generated leads over time for a predetermined range of cost (expenditure). As described further below, the estimated number of leads per unit time for a range of payments may be generated by the Sales Tool 102 in cooperation with operations by the CP Tool 103.

The operation represented by the box 206 comprises receiving a payment to establish a marketing campaign for at least one of the suggested costs over the range of costs. More particularly, the pricing engine 106 determines the cost, or price, using data from the database 108 and using information from the platforms 110. The operation of the box 206 comprises receiving at least an initial payment from the target business entity to establish a sales account for the business entity marketing campaign. Further details of the pricing operation are described below.

In the operation represented by the box numbered 208, the system generates a mix of leads from the platforms according to at least one of the suggested lead values. The proposed mix may be responsive, for example, to a budget that is offered by the target business entity and with which the call flow pricing must comply, or the proposed mix may be responsive to a requested or proposed call flow volume expressed in expected calls per month, or the like.

The operation represented by the box 210 comprises adjusting the proposed mix of leads from the platforms in response to data relating to performance and pricing of the proposed mix. The data relating to performance is typically received by the pricing engine 106 from the master database manager 108 and from the platforms 110. The data contains information such as actually experienced call flow volume, click rate on Web sites, email message traffic, and other such contacts that may be characterized as having been generated via the system and the ads 114 delivered by the system.

The master database manager 108 is populated with information that is obtained, in part, by data that is input to the system via the sales tool device 102. The sales tool device, for example, may comprise a tablet computer such as an "iPad" from Apple, Inc of Cupertino, Calif., USA, and the sales tool device may execute an application that provides a user interface through which data may be collected. Other implementations of sales tool devices are also suitable, if such implementations are capable of performing the operations described herein.

Figure 3:
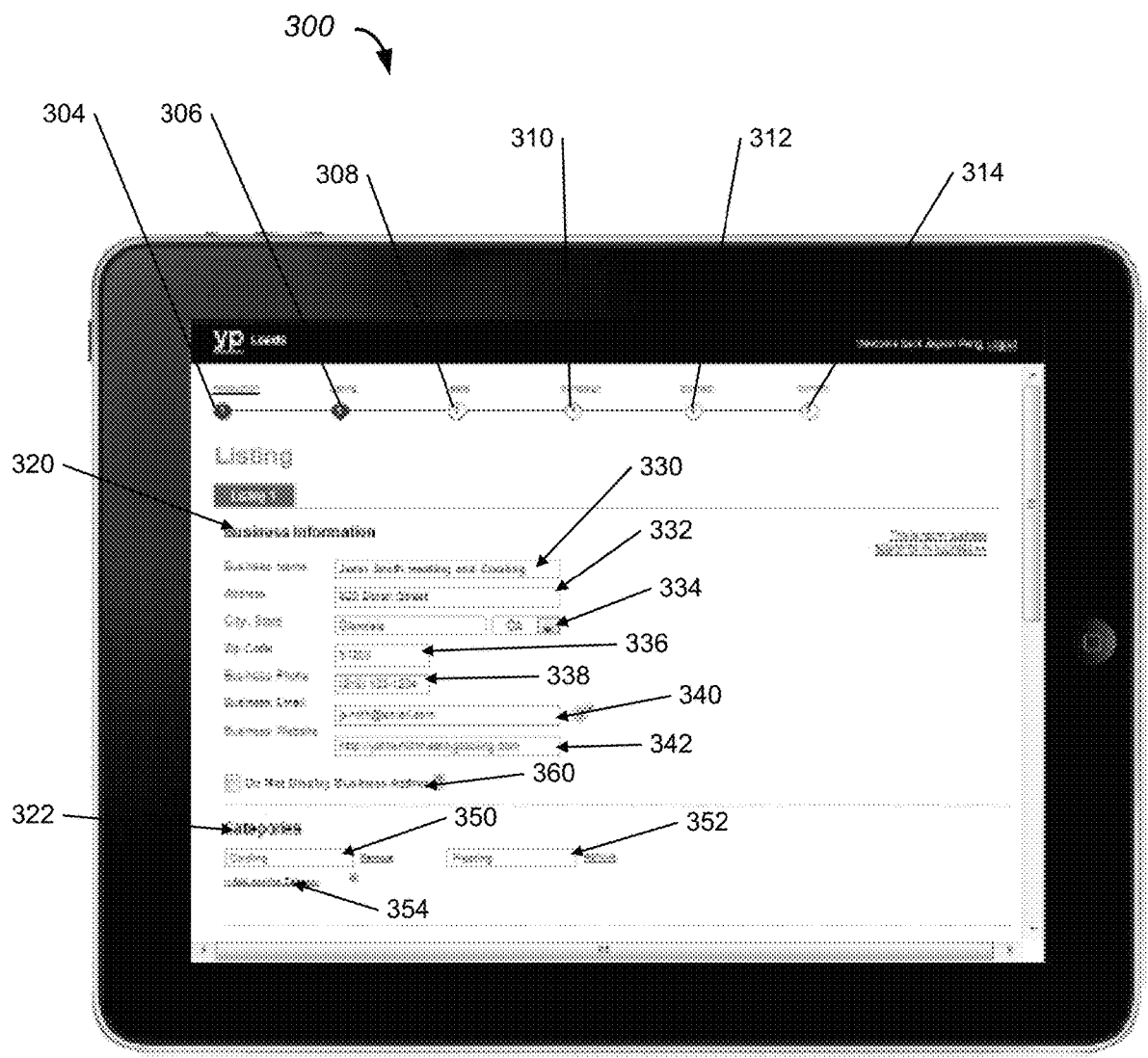
FIG. 3 is an exemplary interface for a user that is displayed on a computing device for receiving input in accordance with the system illustrated in FIG. 1.

FIG. 3 shows an exemplary user interface 300 that is displayed on a screen of the sales tool computing device 102 for receiving input in accordance with the system illustrated in FIG. 1. FIG. 3 shows a horizontal timeline of six milestones across the top of the FIG. 3 screenshot. The six milestones correspond to different screen displays or pages of the user interface, each of which solicits information in the process of operation for generating the marketing campaign that is the subject of the system. All six milestones are viewable across the screen display of all the corresponding screenshots for each milestone, for convenient viewing of the progression in generating the marketing campaign. The labels of the six milestones depicted in FIG. 3 are, from left to right: Introduction 304, Listing 306, Leads 308, Campaign 310, Contract 312, and Content 314.

Business Listing

FIG. 3 is a page or window display that corresponds to the "Listing" milestone 306 in the timeline of the six milestones that are shown across the top of the FIG. 3 screenshot. The "Listing" page shows the business listing information of the target company or client for whom the marketing campaign is being generated. The proposed marketing campaign will typically include a proposed number of leads to be generated, and may comprise a range of values for the proposed number of leads. The input data may include business information of the target (client) business entity, including business categories associated with the target business entity. The input is solicited by the FIG. 3 "Listing" display, which includes text for identifying information inputs or parameters, along with corresponding text boxes in which the input is received.

FIG. 3 shows that the display page includes an upper display portion identified by "Business Information" 320 and a lower display portion identified by "Categories" 322, both portions are for the input of business parameters. Each of the input business parameters listed in FIG. 3 includes a corresponding text input box in which data is entered or selected. The "Business Information" 320 input business parameters include Business name 330, Business Address 332, City/State 334, Zip code 336, Business phone 338, Business email 340, and Business Website (i.e., URL) 342. As examples of data, in the text box 330, the name is shown as "John Smith Cooling and Heating"; the address text box 332 shows 123 Doran Street, the city/state box 334 indicates Glendale, Calif.; Zip code 336 indicates 91209; phone 338 is 818-555-1234; email text box 340 shows "jsmith@email.com"; and Website URL text box 342 shows a URL of "johnsmithheatingandcooling.com". The "Categories" of the input parameters include two drop-down menus 350, 352 from which input selections may be made. For example, FIG. 3 shows a first menu selection 350 of "Cooling" and a second menu selection 352 of "Heating". The drop-down menu items that are available for selection by a user operator of the system will be chosen by the provider of the system or by an authorized user operator, in accordance with businesses to be accommodated and markets to be served. Additional drop-down menu boxes may be created by an authorized user operator of the sales system tool by selecting an "Add Additional Categories" menu button 354, which will provide a window from which an authorized user operator can add menu items. Other display options may be provided for in FIG. 3, such as a toggle button 360 labeled "Do Not Display Business Address".

Figure 4:
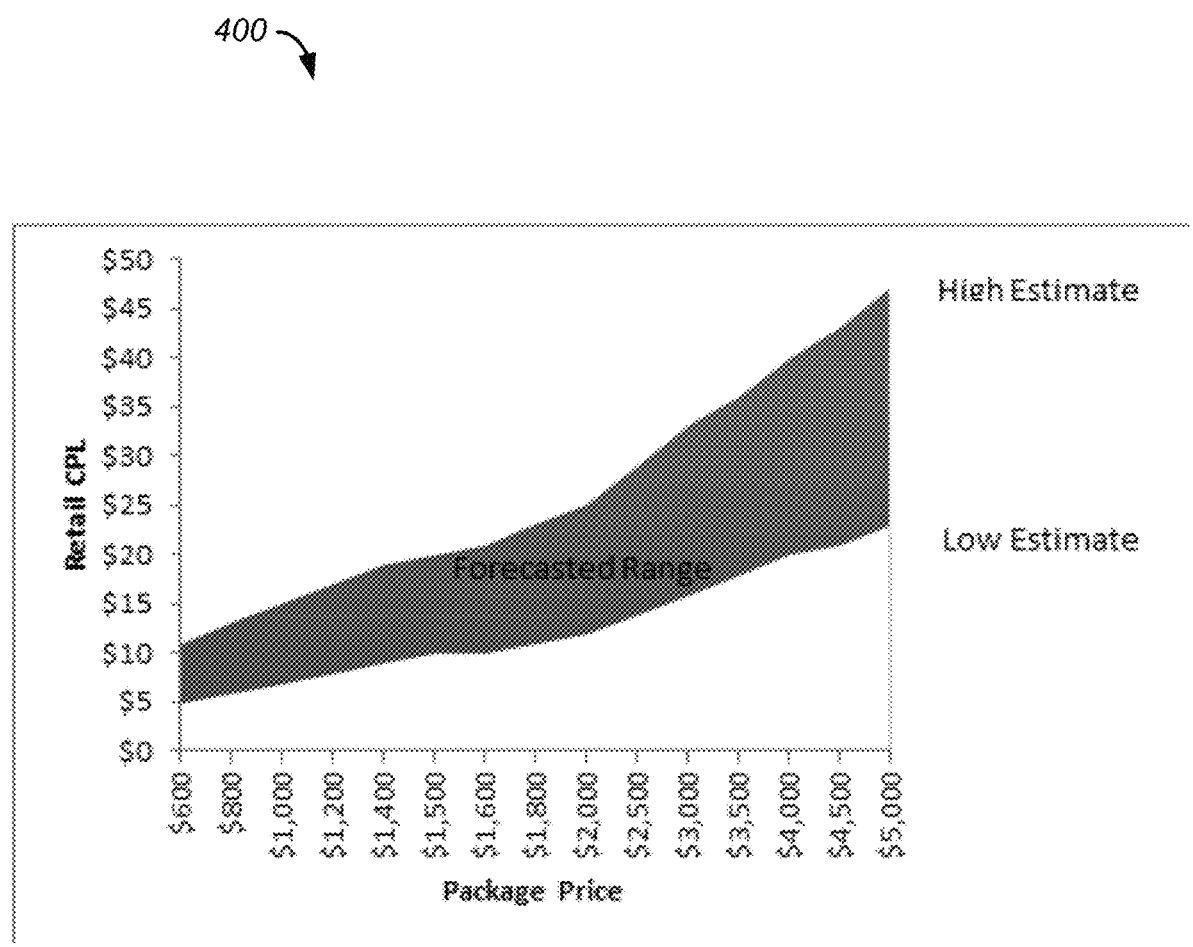
FIG. 4 is an exemplary interface for a user that is displayed on a computing device for showing suggested call flow values in accordance with processing performed by the system illustrated in FIG. 1.

FIG. 4 shows an exemplary interface 400 for a user that is displayed on a screen of the computing device for showing suggested call flow values in accordance with processing performed by the system illustrated in FIG. 1. That is, FIG. 4 shows the estimated Retail Cost Per Lead between a range of low estimate and high estimate for a given Package Price of the marketing campaign.

Figure 5:
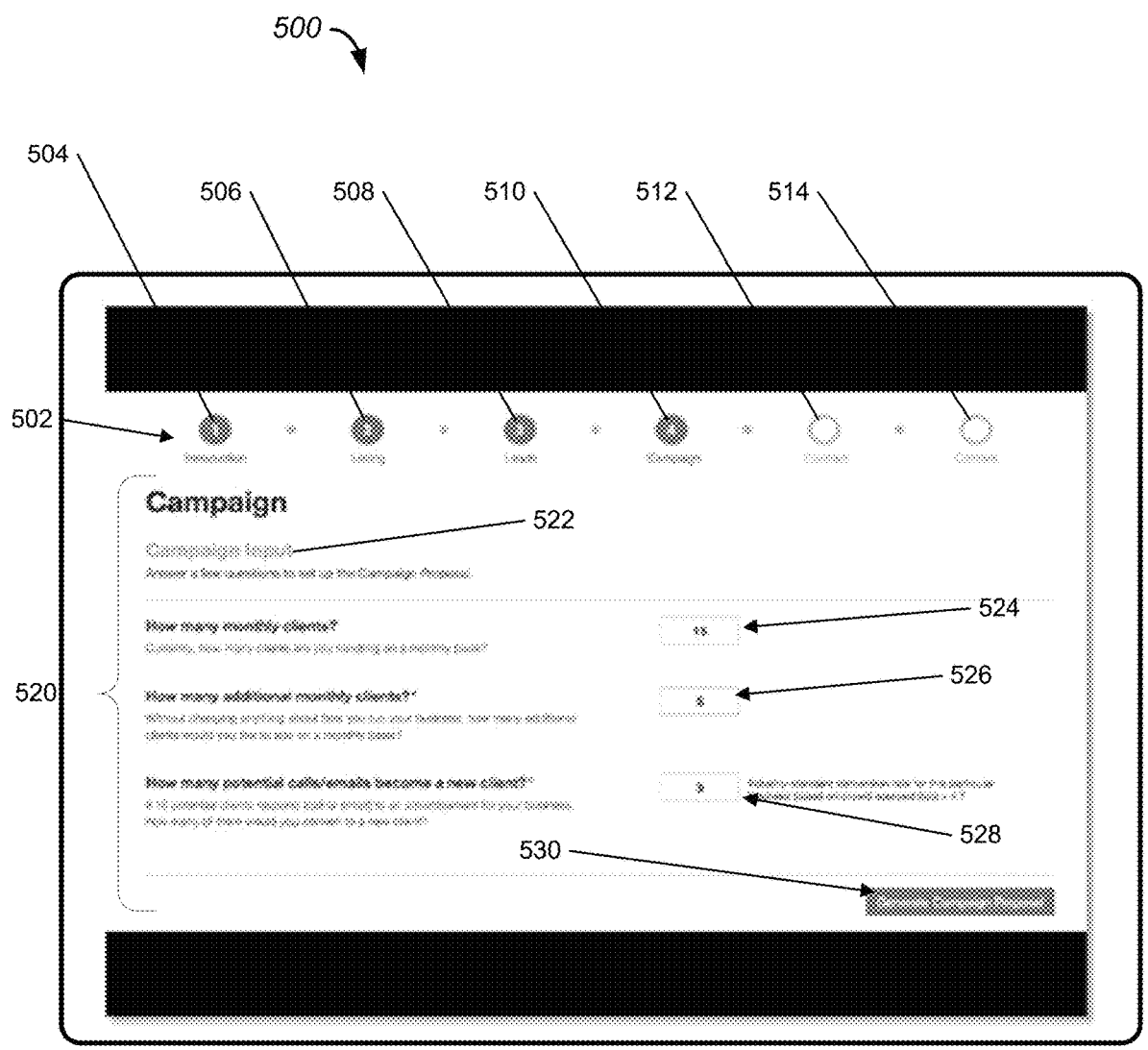
FIG. 5 is an exemplary interface for a user that is displayed on a computing device for collecting user input relating to a marketing proposal in accordance with processing performed by the system illustrated in FIG. 1.

FIG. 5 shows a display screen that provides a report graph generated by the system illustrated in FIG. 1. The report graph provides a forecast or prediction of expected leads in terms of leads per unit time, such as expected leads per month on the vertical axis and time on the horizontal axis. FIG. 5 shows a horizontal timeline of six milestones across the top of the FIG. 5 screenshot, a feature first illustrated in FIG. 3, see above, at a different scale. As with FIG. 3, the labels of the six milestones in FIG. 5 are, from left to right: Introduction 504, Listing 506, Leads 508, Campaign 510, Contract 512, and Content 514.

FIG. 5 is a page or window display that corresponds to the "Campaign" milestone 510 in the timeline of the six milestones that are shown across the top of the FIG. 5 screenshot. The "Campaign" page shows a lower portion 520 of the FIG. 5 display, having a "Campaign Input" heading 522 that indicates input will be collected that relates to the target company or client for whom the marketing campaign is being generated. Text below the "Campaign Input" heading 522 explains that the user will "Answer a few questions to set up the Campaign Proposal." The campaign input is collected via data input boxes in the lower portion 520.

More particularly, each of the campaign input parameters listed in FIG. 5 includes a corresponding text input box in which data is entered or selected. The campaign input parameters are solicited via questions listed in the lower portion 520. The questions depicted in FIG. 5 include a first question adjacent a first text box 524 that asks "How many monthly clients?" Text below the first question 524 explains that the question refers to "Generally, how many clients are you handling on a monthly basis?" The user operator will enter a number in the corresponding text box 524. A second question adjacent a second text box 526 asks "How many additional monthly clients?" Text below the second question 526 explains that the question refers to "Without changing anything about how you run your business, how many additional clients would you like to add on a monthly basis?" The user operator will enter a number in the corresponding text box 526. A third question adjacent a third text box 528 asks "How many potential calls/emails become a new client?" Text below the third question 528 explains that the question refers to "If 10 potential clients respond (call or email) to an advertisement for your business, how many of them would you convert to a new client?" That is, the third question asks the target business for their anticipated conversion rate. Additional information on the display page for the third question 528 explains that the conversion rate assumes "industry-standard conversion rate for this particular business based on crowd-sourced data."

When the data has been entered into the FIG. 5 display 500, the system user can select the display button 530 labeled "Generate Campaign Proposal" to cause the system to respond by generating an initial campaign proposal. After the display button 530 has been selected, the initial campaign proposal is generated and the system display changes to the Campaign display, illustrated in FIG. 6.

Figure 6:
FIG. 6 shows a display screen that provides a report graph illustrating a forecast or prediction of expected leads of the system illustrated in FIG. 1.

FIG. 6 shows the Campaign display 600 of the system. As noted above with respect to the timeline display, the timeline in FIG. 6 indicates the system is operating at the Campaign event 602. A portion of the campaign proposal is depicted in FIG. 6, which shows the heading "Campaign Proposal" 604 with the text explanation that "These are the campaign packages based on your campaign input and other parameters." A scrollable list of campaign package proposals occupies the remainder of the display window. Typically, the top-most campaign package illustrated in the window 600 is a Recommended Package 608, which is visible in FIG. 6. In the example display, the recommended package includes an estimated ten to fifteen monthly leads generated, with an estimated value of monthly leads at US$8500.00 to US$9000.00 and monthly investments indicated at US$4700.00 (i.e., a marketing campaign cost of $4700 with an estimated return of $8500-$9000 in value for new leads. A leads forecast graph is provided in the campaign summary, comprising a graph with information similar to that shown in FIG. 4. The display can optionally provide a short description of the primary features or characterization of the marketing campaign.

Additional Details of Marketing Campaign

The marketing campaign will typically be sold as an annual contract with evergreen renewal. The target leads may be adjusted at renewal time, based on the performance of the preceding time period, and based on the current supply and demand. An account manager for the target business entity may need to manage any communications for the renewal, if there are changes.

Contract/Billing

When the customer (target business entity) agrees to a product, then the sales tool application, through the sales tool device 102, will include support to accept payment via credit card or debit card, or the like. The marketing campaign may be initiated via the pricing engine, upon authorization. The sales tool application will then complete the content collection for the full set of products, using the content 112 and ad delivery 114 components. Content may later be reviewed by the account managers. Upon completion of the authorization for the marketing campaign, the target business entity should receive a welcome package, introducing their account manager by name as their dedicated point of ongoing contact. The first instance of the ads generated from the content and ad delivery should be sent out from the system within 60 minutes or less of the authorization being received from the target business entity.

Fulfillment

When the pricing engine 106 receives the "initiate campaign" authorization, it will set up the budgets and targets for the marketing campaign. In conjunction with the marketing campaign, the pricing engine will communicate with the content 112 and ad delivery 114 to immediately launch three ad appearances for every combination of business location and category, such as a priority listing, a category sponsor, and a mobile premier listing. The listings will preferably be geo-targeted to either a point-and-radius location area, or a list of "Zip" postal codes.

Reporting

Customers, i.e., the target business entities, will receive monthly reports of performance for the marketing campaign via email messages. The reports may include information such as which calls were counted, any call recording information obtained, and form fill information. The reports may also include information about Web site clicks, and the like. The email will include campaign progress to date, against targets to date (taking into account seasonality and ramp), and similar performance information.

Performance Management

The pricing engine 106 will be configured to automatically manage the marketing campaigns. For example, when the pricing engine notices a shortfall in performance, as when a campaign is underperforming (the cost per lead is outside acceptable ranges), it will send an alert message to an authorized person to review that marketing campaign data for errors. A percentage of the target business entities, typically up to 15% of the marketing campaigns, may be underperforming and will be flagged, and reviewed by authorized persons.

Revenue Handling

At the beginning of each "accounting period" (first of the month, or at contract start), the pricing engine will accrue revenue for each active campaign. A contribution is computed by multiplying the revenue by a campaign specific target TAC (Traffic Acquisition Cost) ratio. All contribution dollars are attached to a campaign ledger, so contributions can be tracked at the campaign level. Thus, marketing campaign performance is tracked daily. Each campaign will be debited for the cost of any traffic. Debits are applied against the campaign ledger which received the traffic.

Measuring Performance

At weekly intervals, each campaign will be evaluated for performance. During performance management, factors such as the following may be evaluated:

How many leads should have been delivered up to the current time

How many leads have been delivered up to the current time

How many additional leads do we expect to acquire for the rest of the campaign?

How many of those leads should ideally come during the next week?

The target leads to date is a fairly simple computation, but will account for seasonality curves (and possibly "ramp up" time). In general, the median of the lead range is targeted. Delivered leads to date is a simple computation. If a customer has opted out of the CTN, calls will be estimated using heading level click-to-call rates. Otherwise, the actual measured calls may be used. The total number of leads is defined as all calls, excluding the following:

Telemarketer calls (these will not even show up in the call logs)

Unanswered calls (not a lead, but these will show up in the call logs)

Calls <10 seconds (not a lead, but these will show up in the call logs)

Duplicate calls from the same number within a 24 hour UTC day (not a lead, but these will show up in the call logs)

All call flow pricing is produced within the context of a specific advertiser, with a specific campaign definition. That definition includes (but is not limited to) a set of one or more business locations, with one or more heading codes, and some geographic targeting (not strictly speaking directory codes). Targeting may vary by location, it need not be consistent across the campaign.

Before generating prices, the target business entity who will comprise the advertiser is scored. The most desirable advertisers (those with robust web presences, positive reviews, and excellent CTR or SEO juice) are given an "A" score indicating greater desirability. The average advertisers are given a "B" score indicating a next degree of desirability. The least desirable advertisers (those with no web presence and/or negative reviews, that people actively avoid when presented), are scored as a "C". This scoring may be performed by the pricing engine 106. In general, "A" advertisers are given a discount to their target ERPPL (Effective Retail Price Per Lead), and "C" advertisers are charged a corresponding premium to their target ERPPL.

In order to determine leads pricing, it is first necessary to estimate what leads are available for a given campaign from organic products. In general, additional headings or geographic scope will expose more leads. When more organic leads are available, pricing will be closer to the target pricing. Next, how much additional leads will cost from the outside platforms 110 will be estimated. Using the information, a cost per lead for a given number of leads is generated.

Using the previous two pieces of information, a curve that says how much, on average, it will be expected to pay for any given number of leads can be calculated. For organic leads, the average cost per click on the network is used as a starting point, and is supplemented with the percentage of traffic which is provided by the network on average, and the target ERPPLs for the headings under consideration (this is a table driven data view, which is updated manually on an ongoing basis).

The preceding operations create a curve which says, for each target number of leads, what is our recommended average price. An exemplary curve is illustrated in FIG. 4, discussed above.

In order to generate a target lead range for a given price point (e.g. $200, $300, etc.), it is only necessary to find the point along the curve which matches that spend level, giving a target number of leads and a target cost per lead. The system computes a low and high lead range for the given price point, which includes +/−20% of the given ERPPL. For example, if there is a $40 target ERPPL for a $1000 package, then the low lead range would be 1000/(40*1.2) or 21 leads, and the high lead range would be 1000/(40*0.8) or 31 leads. The $1000 offer becomes 21-31 leads (the backend system would generally target the middle—25 leads).

Depending on how much the traffic now costs, this offer may or may not be a good value to the advertiser. The final qualification step is to estimate the ROI of the package. ROI is computed as follows: Number of leads*Conversion Rate*Value Per Transaction*Lifetime Value.

The sales tool application will receive all available offers from $200 up to $2000, subject to the above constraints. The sales tool application will initially present the cheapest offers where the minimum lead target equals or exceeds the customer's lead goals. The offer may be adjusted up or down within the range of packages returned by the pricing engine. In general, the Cost Per Lead will increase as the package gets more expensive, and will also increase as IYP inventory is sold (because the computed expense will tend to reflect mostly SEM (Search Engine Marketing) pricing).

Performance Implementation

Each month that a target business entity is billed for the marketing campaign, revenue is allocated based on the TAC (Traffic Acquisition Cost) percentage recorded for that business entity. All traffic delivered to that entity will be debited appropriately. This will impact how much money is available to spend on SEM. The budget will not be exceeded without manual intervention.

Additional Features—CP Tool

The system of FIG. 1 can provide guidance to a potential advertising customer regarding a type of marketing campaign for consideration by the customer. The potential program is presented to the customer such that an estimation of what kind of return may be expected for the various phone, Web, print, mail, and other options that may be offered. The data for presentation is organized and presented in a manner to highlight the potential success of the program and persuade the potential customer to engage the offered marketing services.

Figure 7:
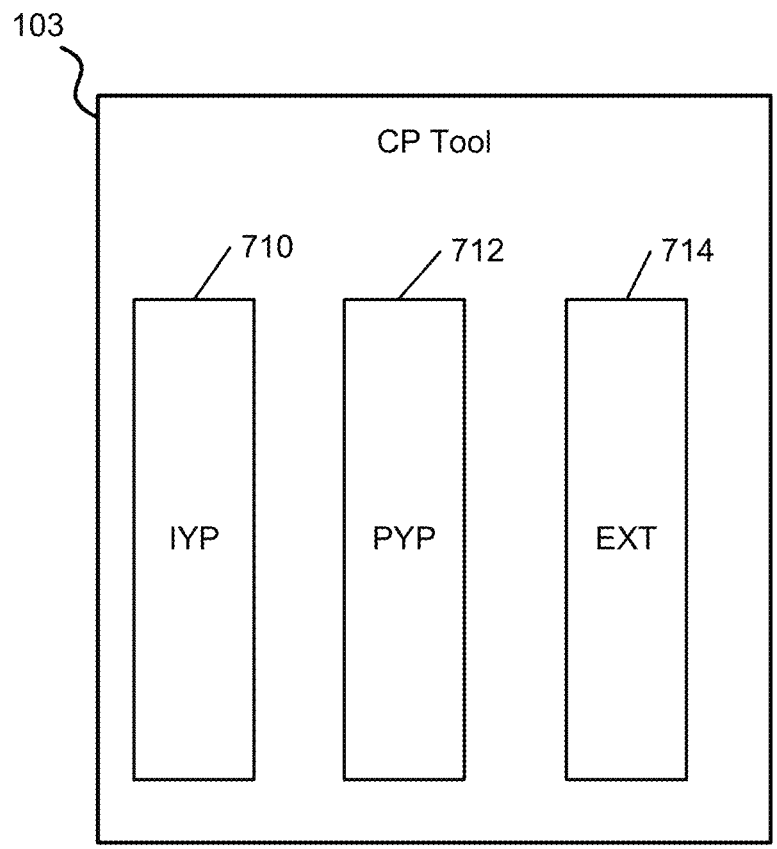
FIG. 7 is a block diagram of the CP Tool, showing data sources available to the tool.

FIG. 7 is a is a block diagram that shows the data sources available to the CP Tool 103. As noted above, the projections for leads and costs are computed in the FIG. 1 system by the CP Tool 103. FIG. 7 shows the available sources include Internet source data IYP (Internet Yellow Pages data) 710, printed source data PYP (Printed Yellow Pages) 712, and external source data (EXT) 714. The EXT data 714 may be obtained from data sellers, such as: Google, Inc. of Mountain View, Calif., USA; Yahoo! Inc. of Sunnyvale, Calif., USA; Bing search engine by Microsoft Corporation of Redmond, Wash., USA; blogs, Web sites, and the like. In this way, the CP tool produces leads estimates in accordance with a hybrid data model that utilizes these multiple sources of data of disparate basis. The combining of the disparate sources of data is performed by the CP Tool in accordance with the received parameters, as described above.

Figure 8:
FIG. 8 is an exemplary interface for a CP tool user that is displayed on a computing device for receiving input in accordance with the system illustrated in FIG. 1.

FIG. 8 is an exemplary interface for a CP tool user that is displayed on a computing device for receiving input in accordance with the system illustrated in FIG. 1. The display screen 800 illustrated in FIG. 8 shows a Summary display that illustrates the three data sources mentioned above for FIG. 7: Internet source data IYP (Internet Yellow Pages data) 710, printed source data PYP (Printed Yellow Pages) 712, and external source data (EXT) 714. The display 800 shows an abbreviated summary of information regarding the three data sources, at the "Summary" tab of the menu bar 802. Next to the Summary tab on the menu bar, the display screen 800 also shows three respective source tabs "Print (PYP)", "Internet (IYP)", and "YP Connect (SEM)" (i.e., external source data).

In the example Summary of FIG. 8, the location being supported by the system is the Cleveland, Ohio, USA area. Under the top menu bar 802 showing the Summary tab, each of the three alternative data sources are listed with additional information. The three data sources are listed under the column "PrintYP Products & Performance" 804 for Cleveland, "Internet YP Products and Performance" 806 for northwest (NW) Cleveland, and "YP Connect Products & Performance" 808 for Cleveland-Akron (Canton) Ohio area.

Beneath each column heading 804, 806, 808 in FIG. 8 is information providing further details, in a list of products by name and number of expected calls. For example, under Print products 804, the additional information in the Summary display shows "Typical Potential Call Counts" with column headings of Product Name and High (Calls/Mo) and Low (Calls/Mo) (not shown). The product names refer to various products for presentation of information that may be provided by the system, such as TQPV (three quarter page vertical), DT (two facing full page graphs), PP (Page Plus, two facing pages of data), FP (full page of data), HP (half page display), THC (triple half column), TQP (three quarter page, horizontal), LA (leader ad), 8HS (4-inch space listing), 6HS (3-inch space listing), 7HS (3.5-inch space listing), DHC (double half column), and EDGO (editorial guide). Beneath the Print products column is a bar graph that illustrates average calls per month for the Print data, showing high and low call totals for each of the product names in the column list, ranked by call total.

Similarly to the Print data, the middle data source information comprising Internet products 806 is a data table showing Internet product names, with a heading "Typical Range of Clicks & Calls" and beneath that heading, a column for product names, a column for typical number of "clicks" per product, and a column for calls/month. Internet product names denote levels of service, typically subscription-type services, such as Premium (PLL), Diamond, Platinum, Gold, Silver, and Bronze/Trade Listing. The bar graph beneath the data table shows the Internet product names and corresponding expected average clicks per month. Lastly, the right-hand data source information relates to external sources of data 808, such as would be paid to third-party vendor data providers. In FIG. 8, the heading "YP Connect Products & Performance" 808 shows data for Monthly Leads for external data sources. Beneath the "Monthly Leads" heading is a column for Product Name, a column for Projected Monthly Connections, and a column for Leads/month. The product names correspond to offerings by the third-party vendors. The bar graph beneath the data table shows monthly cost for each third-party product on the horizontal axis and average leads for each third-party product on the vertical axis. The tabs on the menu bar for each of the three data sources will display additional information about the respective data source, when selected.

Returning to the discussion of FIG. 7, the CP Tool 103 assists the Sales Tool device 102 in generating estimated production from each type of available data platform 710, 712, 714. The CP Tool 103 can combine information from the data platforms to provide real-time results of lead production, and may also assist in dynamically adjusting the combination of information from the data platforms to provide the desired (i.e., estimated) lead production. The CP Tool 103 generates estimates for sales leads and also has the ability to generate reports on leads production independently of any data sharing with the sales tool 102. For example, the CP Tool 103 may be used to prepare for a sales call by generating reports of a target business entity in which a report includes market data such as an industry segment that contains the target business entity, a business type, market segment in revenue amount, number of employees, marketing budget, number of locations, geographic distribution, and the like. The CP Tool will rely on data from the master database manager 108 and from user input, such as received through the sales tool device 102.

It should be understood that the system 100 comprises a leads system such as offered by Yellow Pages, LLC via their "YP.com" Web portal. As such, the system 100 is capable of utilizing CTN (call track number) features, and includes paid advertisements and unpaid advertising. The unpaid advertising includes, for example, public domain information such as a business location and telephone number from public listings. The paid advertising includes advertising listings of the system (e.g., listings at YP.com), such that the paid listings are limited in number, duration, and presentation. For example, the paid advertising listings typically include assignment of a CTN, where such service is available. For a paid advertisement (listing), click data may also be collected from the Web portal at which the listing appears. Paid advertising may include, for example, larger type size, visual embellishments, additional color, and the like, as compared to unpaid listings. Estimates of leads produced by a listing from the CP Tool 103 may also include click estimates for a Web listing, estimates of impressions from a Web listing, and the like.

The estimated leads production, which may provide estimates over a range of time and geography, is generated by the CP Tool 103 using estimate models, which are based on a combination of prior performance (i.e., historical data) and extrapolations. The CP Tool estimate models are based on the IYP 710, PYP 712, and EXT 714 data sources described above. The models may also comprise combinations of differently sourced data. For example, the IYP data model may be based on a combination of historical Internet-based data sources and ERPPL data (described above). Both types of data provide a cost-per-lead value, and the IYP model typically chooses the lower value as between historical data and ERPPL data, as providing the more conservative cost estimate. The use of both data sources, historical and ERPPL, is useful because historical data may overlook differences between the markets from which the historical data is derived and the market of the target business entity, and the ERPPL data is typically based on system-wide data metrics, which may not apply precisely to the target business entity. To increase the likely accuracy of the historical data, it may be necessary to restrict the historical data to be used so that the historical data is taken only from markets similar to the market of the target business entity.

Similarly, the apportionment that is implemented by the CP Tool 103 as between using data from the IYP 710 and using data from the PYP 712 for generating lead estimates may be adjusted depending on the market area of the target business entity. For example, a target business entity in Palm Beach, Fla. may be faced with customers who are more likely to consult print media for business information, and therefore the CP Tool would weight the IYP and PYP data so as to differentially favor the PYP data in producing the leads estimates data. Conversely, a target business entity in San Jose, Calif. may be faced with customers who are more likely to use Internet sources rather than consult print media, and therefore the CP Tool would weight the IYP and PYP data so as to differentially favor the IYP data in producing the leads estimates data. In utilizing the PYP data, the CP Tool is configured to use statistical considerations in extrapolating leads data in one geographic area or market segment to another geographic area or market segment. The nature of such statistical considerations utilized will depend on empirical knowledge that is a function of the data available to the system, and will be understood by those skilled in the art in view of this description. The data available to the CP Tool includes the data in the database 108, as should be apparent from the system diagram of FIG. 1.

Hardware Configurations

Figure 9:
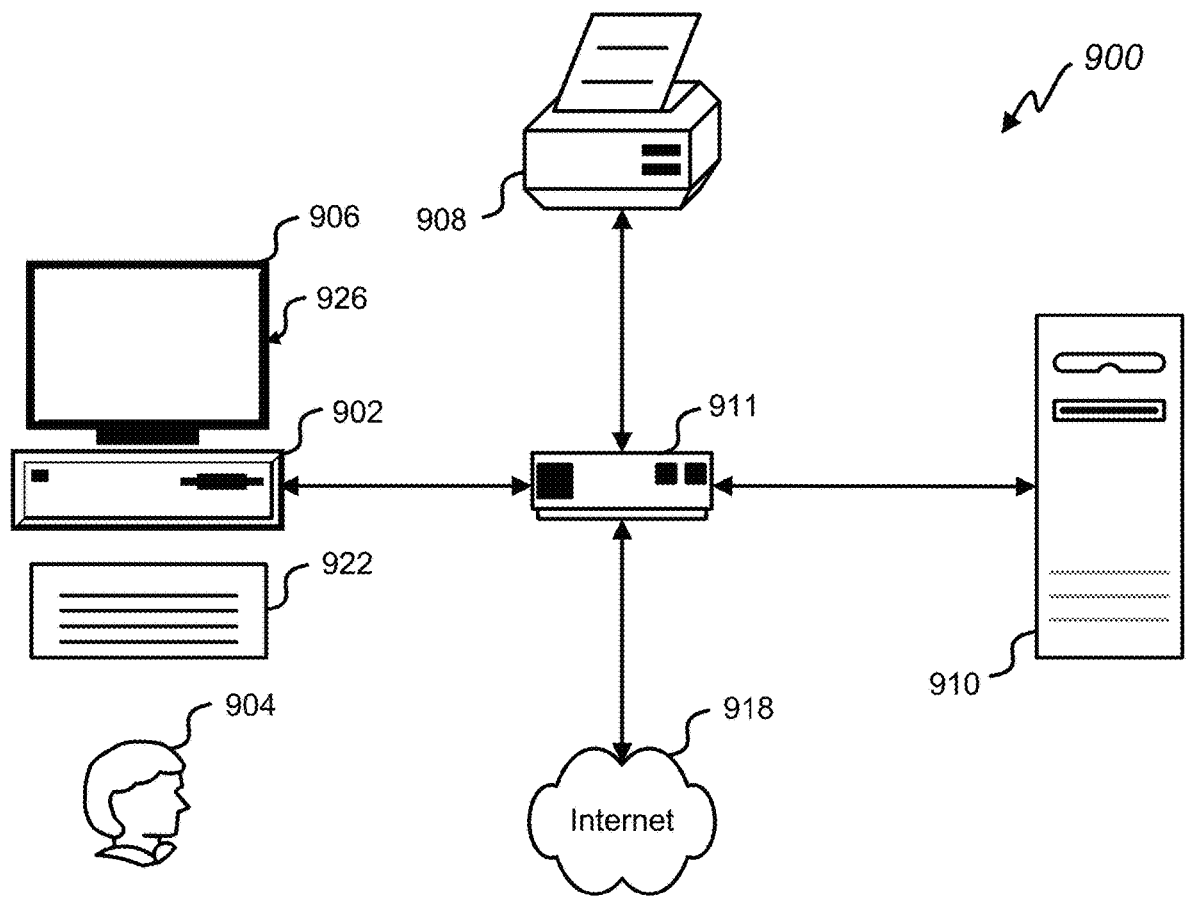
FIG. 9 is a block diagram of an embodiment of a computer system constructed in accordance with embodiments of the system illustrated in FIG. 1.

Referring next to FIG. 9, an exemplary environment with which embodiments may be implemented is shown with a computer system 900 that can be used by a customer or sales person or other marketing tool user 904 to design, for example without limitation, the marketing proposals discussed herein. The computer system 900 can include a computer 902, keyboard 922, a network router 912, a printer 908, and a monitor 906. The monitor 906, processor 902, and keyboard 922 are part of a computer system 926, which can comprise a laptop computer, desktop computer, handheld computer, tablet computer, mainframe computer, etc. The monitor 906 can comprise a CRT, flat screen display, and the like.

A user 904 can input commands into the computer 902 using various input devices, such as a mouse, keyboard 922, track ball, touch screen, and the like. If the computer system 900 comprises a mainframe computer, then the designer user 904 can access the computer 902 using, for example without limitation, a terminal or terminal interface. Additionally, the computer system 926 may be connected to a printer 908 and a server 910 using a network router 912, which may connect to the Internet 918 or a WAN.

The server 910 may, for example without limitation, be used to store additional software programs and data. In some embodiments, software implementing the systems and methods described herein can be stored on a storage medium in the server 910. Thus, the software can be run from the storage medium in the server 910. In another embodiment, software implementing the systems and methods described herein can be stored on a storage medium in the computer 902. Thus, the software can be run from the storage medium in the computer system 926. Therefore, in this embodiment, the software can be used whether or not the computer 902 is connected to the network router 912. The printer 908 may be connected directly to the computer 902, in which case, the computer system 926 can print whether or not it is connected to the network router 912.

Figure 10:
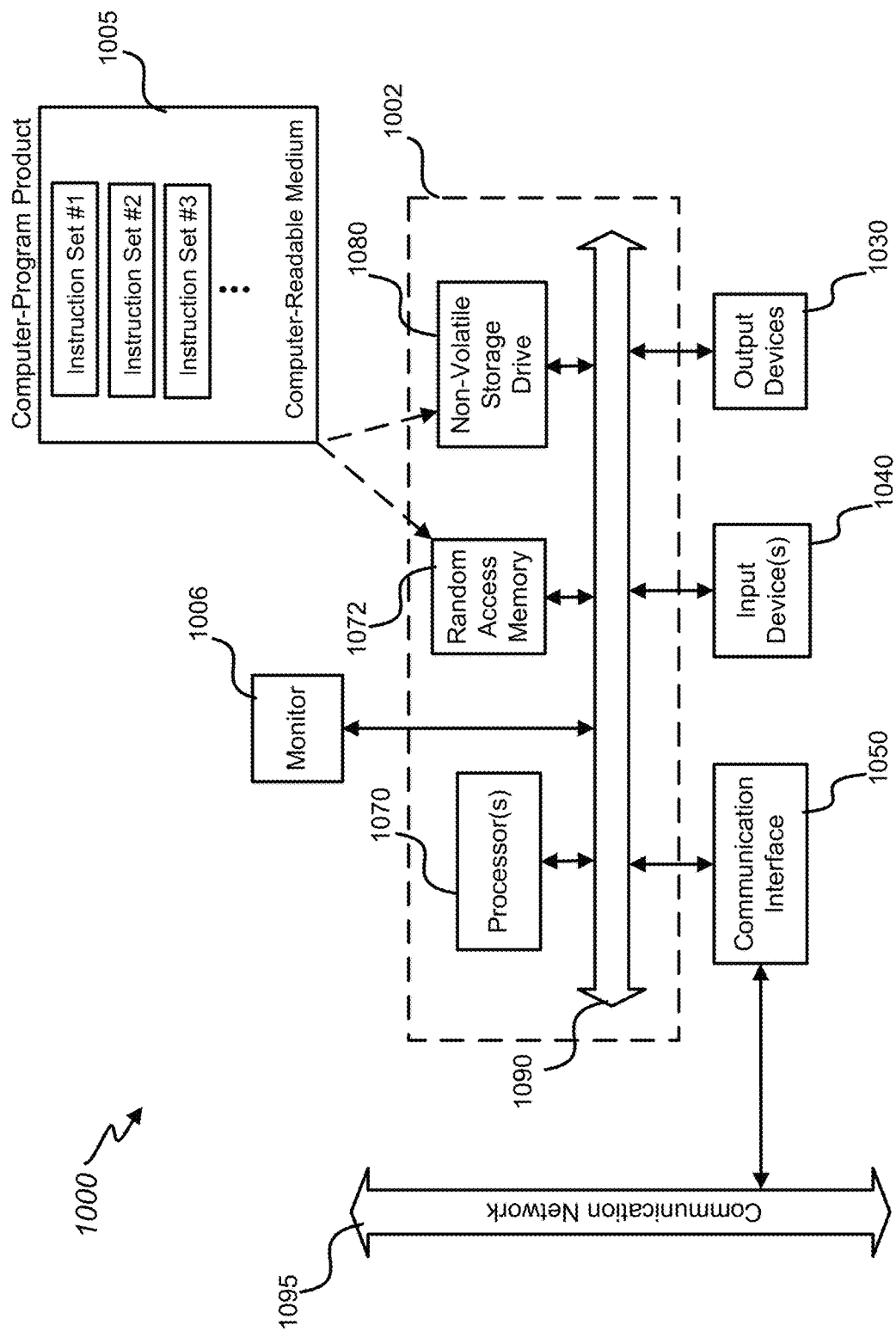
FIG. 10 is a block diagram of an embodiment of a special-purpose computer system constructed in accordance with embodiments of the system illustrated in FIG. 1.

FIG. 10 shows an embodiment of a special-purpose computer system 1000 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. The computer-program products may be loaded or installed on a general purpose computer system, after which the general purpose system is transformed into the special-purpose computer system 1000.

The special-purpose computer system 1000 comprises a computer 1002, a monitor 1006 coupled to the computer 1002, one or more additional user output devices 1030 (optional) coupled to the computer 1002, one or more user input devices 1040 (e.g., keyboard, mouse, track ball, touch screen) coupled to the computer 1002, an optional communications interface 1050 coupled to the computer 1002, a computer-program product 1005 stored in a tangible computer-readable memory that may be placed in the computer 1002. The computer-program product 1005 includes instructions that, when executed by the computer, direct the system 1000 to perform the above-described operations. The computer 1002 may include one or more processors 1070 that communicate with a number of peripheral devices via a bus subsystem 10100. These peripheral devices may include a user output device(s) 1030, a user input device(s) 1040, a communications interface 1050, and a storage subsystem, such as random access memory (RAM) 1072 and a non-volatile storage drive 1080 (e.g., disk drive, optical drive, solid state drive), which are forms of tangible computer-readable memory.

The computer-program product 1005 may be stored in the non-volatile storage drive 1080 or another computer-readable medium accessible to the computer 1002 and loaded into the memory 1072. Each processor 1070 may comprise a microprocessor, such as a microprocessor from Intel® or Advanced Micro Devices, Inc.®, or the like. The computer 1002 runs or executes an operating system that supports an operating environment and handles the communications of the computer-program product with the above-noted components, as well as the communications between the above-noted components in support of the computer-program product, in support the computer-program product. Exemplary operating systems include Windows® or the like from Microsoft® Corporation, Solaris® from Oracle®, LINUX, UNIX, and the like.

The user input devices 1040 include all possible types of devices and mechanisms to input information to the computer system 1002. These may include a keyboard, a keypad, a mouse, a scanner, a digital drawing pad, a touch screen incorporated into the display, audio input devices such as voice recognition systems, microphones, and other types of input devices. In various embodiments, the user input devices 1040 are typically embodied as a computer mouse, a trackball, a track pad, a joystick, wireless remote, a drawing tablet, a voice command system. The user input devices 1040 typically allow a user to select objects, icons, text and the like that appear on the monitor 1006 via a command such as a click of a button or the like. The user output devices 1030 include all possible types of devices and mechanisms to output information from the computer 1002. These may include a display (e.g., the monitor 1006), printers, non-visual displays such as audio output devices, and the like.

The communications interface 1050 provides an interface to other communication networks 9105 and devices and may serve as an interface to receive data from and transmit data to other systems, WANs and/or the Internet 1018. Embodiments of the communications interface 1050 typically include an Ethernet card, a modem (telephone, satellite, cable, ISDN), a (asynchronous) digital subscriber line (DSL) unit, a FireWire® interface, a USB® interface, a wireless network adapter, and the like. For example without limitation, communications interface 1050 may be coupled to a computer network, to a FireWire® bus, or the like. In other embodiments, the communications interface 1050 may be physically integrated on the motherboard of the computer 1002, and/or may be a software program, or the like.

The RAM 1072 and non-volatile storage drive 1080 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. The RAM 1072 and the non-volatile storage drive 1080 may be configured to store the basic programming and data constructs that provide the functionality of various embodiments of the present invention, as described above.

Software instruction sets that provide the functionality of the present invention may be stored in the RAM 1072 and non-volatile storage drive 1080. These instruction sets or code may be executed by the processor(s) 1070. The RAM 1072 and non-volatile storage drive 1080 may also provide a repository to store data and data structures used in accordance with the present invention. The RAM and non-volatile storage drive may include a number of memories including a main random access memory (RAM) to store of instructions and data during program execution and a read-only memory (ROM) in which fixed instructions are stored. The RAM and non-volatile storage drive may include a file storage subsystem providing persistent (non-volatile) storage of program and/or data files. The RAM 1072 and non-volatile storage drive 1080 may also include removable storage systems, such as removable flash memory.

The bus subsystem 10100 provides a mechanism to allow the various components and subsystems of the computer 1002 to communicate with each other as intended. Although the bus subsystem 10100 is shown schematically as a single bus, alternative embodiments of the bus subsystem may utilize multiple busses or communication paths within the computer 1002.

Thus, described above is a system that provides real-time response through operations that include: (1) generating an estimated number of leads per unit time for a range of expenditures by a target business entity in response to received parameters of the target business entity; (2) generating a value comprising a proposed mixture of leads from a plurality of platforms in response to a specified cost expenditure, wherein each proposed leads value specifies a suggested number of leads to be provided to the target business; and (3) adjusting the proposed mixture of leads corresponding to the specified cost expenditure, in response to performance data and pricing information relating to the proposed mixture of leads. The received parameters of the target business entity or customer of the first operation (1) are provided from the customer, or target business entity. The proposed mixture of leads from a plurality of platforms of the second operation (2) is generated in response to a cost expenditure (budget) that comes from the customer (or from the salesperson who is generating a campaign for a target business). The adjustment to the proposed mixture of leads occurs in real time, in response to the performance data and pricing information, after the target business entity or customer gets a report of their specific mixture of leads and how their ads actually performed. Again, this happens in real time and is a feature of the disclosed system.

Specific details are given in the above description to provide a thorough understanding of the embodiments. However, it is understood that the embodiments may be practiced without these specific details. For example without limitation, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example without limitation, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example without limitation, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning

What is claimed is:

1. A computer-implemented method for dynamic determination of allocation and fulfillment in a system, the method comprising:

operating a sales tool on a user operated computing device;

presenting, with the sales tool, and displaying user input fields displayed on a user interface of the user operator computing device communicating on an internal network for entry of campaign input parameters and receiving campaign input parameters through the user interface for determining a target amount of leads for a selected marketing campaign;

displaying, with the sales tool operating on the user operator computing device, timeline milestones of a marketing campaign on the user interface where the timeline milestones correspond to screen displays of the user interface;

receiving at a sales management component operating at a computing system of the internal network, the campaign input parameters received through the user interface of the user operator computing device, and a mixture of lead sources from a plurality of platforms communicating on the internal network, where the plurality of platforms include internal network lead generating sources and external network lead generating sources and where the sales management component is operating on the computing system of the internal network and communicating campaign input parameters, and lead information to a pricing engine operating at the computing system and where the pricing engine receives the mixture of lead sources from the plurality of platforms, which stores the lead information to the master database, and where the internal lead sources are interconnected over the internal network, and the external lead sources are interconnected with the internal network via a wide are network, and where the internal lead source platforms includes one or more of an electronic business listings, an email server and a telephone server, and where the external lead source platforms includes one or more of online search engine services and web portals;

operating a customer projection tool at the computer system and projecting leads from the plurality of internal and external platforms with said customer projection tool;

determining, with the sales management component processing at the computer system, the mixture of lead sources with the pricing engine by determining an estimate of available leads from internal network lead generating sources with the customer projection tool and determining additional leads from external lead generating sources needed to satisfy a target amount of leads for the selected marketing campaign spend level and determining a cost per lead based on the estimate of available leads and the additional leads and determining a price for the target amount of leads that matches the selected marketing campaign spend level;

generating, via the one or more processors processing the customer projection tool, an estimated number of leads per unit time for a range of expenditures by the target business entity in response to received parameters of the target business entity;

generating a value, with the sales management component processing at the computing system, comprising a proposed mixture of leads from the plurality of platforms in response to a specified cost expenditure, wherein each proposed leads value specifies a suggested number of leads to be provided to the target business entity as originated from each of the respective platforms as determined by business rules preferences including one or more of cost, number of desired leads and available inventory, the proposed mixture of leads is presented to the user interface of the user operator computing device for user interaction;

adjusting, with the sales management component processing at the computing system, the proposed mixture of leads corresponding to the specified cost expenditure in real time while receiving a mixture of leads from a plurality of platforms, in response to performance data and pricing information relating to the proposed mixture of leads, wherein the pricing information is determined based in part on a score assigned to the target business entity denoting a desirability of interacting with the target business entity; and presenting the adjusted proposed mixture of leads to the user interface of the user operator computing device.

2. The computer-implemented method of claim 1, further comprising:
receiving a service request from the target business entity via a sales tool remote application.

3. The computer-implemented method of claim 1, further comprising:
providing a number of calls obtained from the one or more outside sources from the system to the target business entity.

4. The computer-implemented method of claim 1, further comprising:
performing the adjusting in substantially real time as the performance data and pricing information is received.

5. The computer-implemented method of claim 1, wherein generating the estimated number of leads per unit time is performed using a hybrid model that incorporates data from a combination of data sources including Internet sources of data, print sources of data, and external sources of data, in accordance with the received parameters.

6. A system comprising:
a user operator computing device having a sales tool configured such that it performs presenting user input fields being displayed on a user interface of the user operator computing device communicable on an internal network, where the user input fields are configured for entry of campaign input parameters and receiving campaign input parameters through the user interface for determining a target amount of leads for a selected marketing campaign;

said sales tool configured such that it performs displaying on the user operator computing device, timeline milestones of a marketing campaign on the user interface where the timeline milestones correspond to screen displays of the user interface;

a sales management component of a computing system of the internal network configured to cause the computing system to perform receiving the campaign input parameters through the user interface of the user operator computing device, and perform retrieving a mixture of lead sources from a plurality of platforms communicating on the internal network, where the plurality of platforms include internal network lead generating sources and external network lead generating sources and where the sales management component is configured to cause the computing system to perform communicating campaign input parameters, and lead information to a pricing engine operating at the computing system and where the pricing engine receives the mixture of lead sources from the plurality of platforms, which stores the lead information to a managed master database, and where the internal lead sources are interconnected over the internal network, and the external lead sources are interconnected with the internal network via a wide are network, and where the internal lead source platforms includes one or more of an electronic business listings, an email server and a telephone server, and where the external lead source platforms includes one or more of online search engine services and web portals;

operating a customer projection tool at the computer system and projecting leads from the plurality of internal and external platforms with said customer projection tool;

said sales management component processing at the the computing system configured to determine the mixture of lead sources with the pricing engine by determining an estimate of available leads from internal network lead generating sources with the customer projection tool and determining additional leads from external lead generating sources needed to satisfy a target amount of leads for the selected marketing campaign spend level and determining a cost per lead based on the estimate of available leads and the additional leads and determining a price for the target amount of leads that matches the selected marketing campaign spend level;

said pricing engine comprising one or more processors that are configured to access data in the managed master database and execute instructions stored in the database causing the system to:

generate with the customer projection tool an estimated number of leads per unit time for a range of expenditures by the target business entity in response to received parameters of the target business entity;

generate a value with the sales management component processing at the computing system, comprising a proposed mixture of leads from the plurality of platforms in response to a specified cost expenditure, wherein each proposed leads value specifies a suggested number of leads to be provided to the target business entity as originated from each of the respective platforms as determined by business rules preferences including one or more of cost, number of desired leads and available inventory, the proposed mixture of leads is presented to for user the user interface of the user operator computing device interaction;

adjust, with the sales management component processing at the computing system, the proposed mixture of leads corresponding to the specified cost expenditure in real time while receiving a mixture of leads from a plurality of platforms, in response to performance data and pricing information relating to the proposed mixture of leads, wherein the pricing information is determined based in part on a score assigned to the target business entity denoting a desirability of interacting with the target business entity; and present the adjusted proposed mixture of leads to the user interface of the user operated computing device.

7. The system of claim 6, wherein the one or more processors of the marketing campaign pricing engine are further configured to execute the instructions to cause the system to:

receive a service request from the target business entity via a remote application.

8. The system of claim 6, wherein the one or more processors of the marketing campaign pricing engine are further configured to execute the instructions to cause the system to:

provide a number of calls obtained from one or more outside sources from the system to the target business entity.

9. The system of claim 6, wherein the one or more processors of the marketing campaign pricing engine are further configured to execute the instructions to cause the system to:

perform the adjusting in substantially real time as the performance data and pricing information is received.

10. The system of claim 6, wherein the one or more processors of the marketing campaign pricing engine are further configured to execute the instructions to cause the system to:

generate the estimated number of leads per unit time by using a hybrid model that incorporates data from a combination of data sources including Internet sources of data, print sources of data, and external sources of data, in accordance with the received parameters.

11. A computer program product, tangibly embodied in a non transitory machine-readable storage medium, the medium including instructions which when executed by one or more processors causes a data processing system to:

operate a sales tool on a user operated computing device;

present, with the sales tool, and displaying user input fields displayed on a user interface of the user operator computing device communicating on an internal network for entry of campaign input parameters and receiving campaign input parameters through the user interface for determining a target amount of leads for a selected marketing campaign;

display, with the sales tool operating on the user operator computing device, timeline milestones of a marketing campaign on the user interface where the timeline milestones correspond to screen displays of the user interface;

retrieve with a sales management component operating at a computing
system of the internal network, the campaign input parameters received through the user interface of the user operator computing device, and a mixture of lead sources from a plurality of platforms communicating on the internal network, where the plurality of platforms include internal network lead generating sources and external network lead generating sources and where the sales management component is operating on the computing system of the internal network and communicating campaign input parameters, and lead information to a pricing engine operating at the computing system and where the pricing engine receives the mixture of lead sources from the plurality of platforms, which stores the lead information to the master database, and where the internal lead sources are interconnected over the internal network, and the external lead sources are interconnected with the internal network via a wide are network, and where the internal lead source platforms includes one or more of an electronic business listings, an email server and a telephone server, and where the external lead source platforms includes one or more of online search engine services and web portals;

operating a customer projection tool at the computer system and projecting leads from the plurality of internal and external platforms with said customer projection tool;

determine, with the sales management component processing at the computer system, the mixture of lead sources with the pricing engine by determining an estimate of available leads from internal network lead generating sources with the customer projection tool and determining additional leads from external lead generating sources needed to satisfy a target amount of leads for the selected marketing campaign spend level and determining a cost per lead based on the estimate of available leads and the additional leads and determining a price for the target amount of leads that matches the selected marketing campaign spend level;

generate, via the one or more processors processing the customer projection tool, an estimated number of leads per unit time for a range of expenditures by the target business entity in response to received parameters of the target business entity;

generate a value, with the sales management component processing at the computing system, comprising a proposed mixture of leads from the plurality of platforms in response to a specified cost expenditure, wherein each proposed leads value specifies a suggested number of leads to be provided to the target business entity as originated from each of the respective platforms as determined by business rules preferences including one or more of cost, number of desired leads and available inventory, the proposed mixture of leads is presented to the user interface of the user operator computing device for user interaction;

adjust, with the sales management component processing at the computing system, the proposed mixture of leads corresponding to the specified cost expenditure in real time while receiving a mixture of leads from a plurality of platforms, in response to performance data and pricing information relating to the proposed mixture of leads, wherein the pricing information is determined based in part on a score assigned to the target business entity denoting a desirability of interacting with the target business entity; and present the adjusted proposed mixture of leads to the user interface of the user operator computing device.

12. The computer program product of claim 11, further including instructions which when executed by the one or more processors of the data processing system causes the data processing system to:
receive a service request from the target business entity via a remote application.

13. The computer program product of claim 11, further including instructions which when executed by the one or more processors of the data processing system causes the data processing system to:
provide a number of calls obtained from one or more outside sources from the system to the target business entity.

14. The computer program product of claim 11, further including instructions which when executed by the one or more processors of the data processing system causes the data processing system to:
perform the adjusting in substantially real time as the performance data and pricing information is received.

15. The computer program product of claim 11, further including instructions which when executed by the one or more processors of the data processing system causes the data processing system to:
perform the generating of the estimated number of leads per unit time by using a hybrid model that incorporates data from a combination of data sources including Internet sources of data, print sources of data, and external sources of data, in accordance with the received parameters.

16. A method for displaying, in a graphical user interface, information relating to a dynamic determination of allocation and fulfillment in a system, the method comprising:
operating a sales tool on a user operated computing device;
presenting, with the sales tool, and displaying user input fields displayed on a user interface of the user operator computing device communicating on an internal network for entry of campaign input parameters and receiving campaign input parameters through the user interface for determining a target amount of leads for a selected marketing campaign;
displaying, with the sales tool operating on the user operator computing device, timeline milestones of a marketing campaign on the user interface where the timeline milestones correspond to screen displays of the user interface;
retrieving at a sales management component operating at a computing system of the internal network, the campaign input parameters received through the user interface of the user operator computing device, and a mixture of lead sources from a plurality of platforms communicating on the internal network, where the plurality of platforms include internal network lead generating sources and external network lead generating sources and where the sales management component is operating on the computing system of the internal network and communicating campaign input parameters, and lead information to a pricing engine operating at the computing system and where the pricing engine receives the mixture of lead sources from the plurality of platforms, which stores the lead information to the master database,
and where the internal lead sources are interconnected over the internal network, and the external lead sources are interconnected with the internal network via a wide are network,
and where the internal lead source platforms includes one or more of an electronic business listings, an email server and a telephone server,
and where the external lead source platforms includes one or more of online search engine services and web portals;
operating a customer projection tool at the computer system and projecting leads from the plurality of internal and external platforms with said customer projection tool;
determining, with the sales management component processing at the computer system, the mixture of lead sources with the pricing engine by determining an estimate of available leads from internal network lead generating sources with the customer projection tool and determining additional leads from external lead generating sources needed to satisfy a target amount of leads for the selected marketing campaign spend level and determining a cost per lead based on the estimate of available leads and the additional leads and determining a price for the target amount of leads that matches the selected marketing campaign spend level;
generating, via the one or more processors processing the customer projection tool, an estimated number of leads per unit time for a range of expenditures by the target business entity in response to received parameters of the target business entity;
generating, via the one or more processors, a value with the sales management component processing at the computing system, comprising a proposed mixture of leads from the plurality of platforms in response to a specified cost expenditure, wherein each proposed leads value specifies a suggested number of leads to be provided to the target business entity as originated from each of the respective platforms as determined by business rules preferences including one or more of cost, number of desired leads and available inventory, the proposed mixture of leads is presented to the user interface of the user operator computing device for user interaction;
adjusting, with the sales management component processing at the computing system, via the one or more processors, the proposed mixture of leads corresponding to the specified cost expenditure in real time while receiving a mixture of leads from a plurality of platforms, in response to performance data and pricing information relating to the proposed mixture of leads, wherein the pricing information is determined based in part on a score assigned to the target business entity denoting a desirability of interacting with the target business entity; and
presenting the adjusted proposed mixture of leads to the user interface of the user operator computing device.

17. The method of claim 16, further comprising:
generating, for a range of specified cost expenditures, a high estimate for a cost per lead based at least in part on said value and said received parameters;
generating, for said range of specified cost expenditures, a low estimate for the cost per lead value based at least in part on historical internet based data and effective retail price per lead, wherein said low estimate is less than the high estimate for the cost per lead;
displaying a graph in the user interface comprising:
a package price axis corresponding to a price based at least in part on campaign input and parameters of a target business entity; said proposed number of leads;

a retail-cost-per-lead axis corresponding to the cost of each lead;
a first curve depicting the high estimate for a cost per lead; and
a second curve depicting the low estimate for a cost per lead.

* * * * *